United States Patent
D'Aluisio et al.

(10) Patent No.: US 12,351,263 B2
(45) Date of Patent: Jul. 8, 2025

(54) BICYCLE WITH COMPLIANT SEAT POST INTERFACE

(71) Applicant: Specialized Bicycle Components, Inc., Morgan Hill, CA (US)

(72) Inventors: Christopher P. D'Aluisio, Corralitos, CA (US); Brenton Haven, Morgan Hill, CA (US); Ian Milliken, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 18/516,103

(22) Filed: Nov. 21, 2023

(65) Prior Publication Data
US 2024/0158032 A1    May 16, 2024

Related U.S. Application Data

(63) Continuation of application No. 17/172,406, filed on Feb. 10, 2021, now Pat. No. 11,851,125, which is a
(Continued)

(51) Int. Cl.
*B62J 1/02* (2006.01)
*B62K 19/36* (2006.01)
*B62K 3/04* (2006.01)

(52) U.S. Cl.
CPC ............ *B62J 1/02* (2013.01); *B62K 19/36* (2013.01); *B62K 3/04* (2013.01); *B62K 2201/08* (2013.01)

(58) Field of Classification Search
CPC ... B62J 1/02; B62K 19/36; B62K 3/04; B62K 2201/08; A42B 3/14
See application file for complete search history.

(56) References Cited

U.S. PATENT DOCUMENTS

| | | | | |
|---|---|---|---|---|
| 1,068,583 A | * | 7/1913 | Harley | B62K 25/286 |
| | | | | 280/284 |
| 3,877,539 A | * | 4/1975 | Tilkens | B62M 7/00 |
| | | | | 267/64.11 |

(Continued)

FOREIGN PATENT DOCUMENTS

| | | |
|---|---|---|
| DE | 19920979 A1 | 11/2000 |
| DE | 202007012110 U1 | 1/2009 |

(Continued)

OTHER PUBLICATIONS

Farley,"Interview: Intense Cycles' Jeff Steber", bikeradar.com, Nov. 29, 2008, M1 1994, (https://www.bikeradar.com/mtb/interview-intense-cycles-jeff-steber/), (20 pages).
(Continued)

*Primary Examiner* — Kevin Hurley
*Assistant Examiner* — Marlon A Arce
(74) *Attorney, Agent, or Firm* — Michael Best & Friedrich LLP

(57) ABSTRACT

A bicycle comprises front and rear wheels, a frame, a seat post, and a damping member. An upper portion of the seat post is movable relative to the frame between a first position and a second position. The damping member couples the seat post to the frame to dampen movement of the upper portion of the seat post. The damping member can be positioned at least partially in a top tube of the frame. Preferably, the seat post flexes when the upper portion of the seat post moves. The frame further includes a securing location for securing the seat post, and the securing location is a distance from the upper end of the seat tube that is at least 30% of a length of a seat tube. The seat post has a front-to-rear width, and the seat tube has a rear wall spaced from the seat post by a gap that is at least 25% of a front-to-rear width of the seat post.

20 Claims, 6 Drawing Sheets

Related U.S. Application Data continuation of application No. 15/947,584, filed on Apr. 6, 2018, now Pat. No. 10,919,592.

(56) References Cited

U.S. PATENT DOCUMENTS

| | | | |
|---|---|---|---|
| 4,679,811 A * | 7/1987 | Shuler | B62K 25/30 |
| | | | 188/129 |
| 5,236,169 A | 8/1993 | Johnsen | |
| 5,271,784 A | 12/1993 | Chen et al. | |
| 5,474,318 A | 12/1995 | Castellano | |
| 5,772,228 A * | 6/1998 | Owyang | B62K 25/30 |
| | | | 280/287 |
| 5,957,473 A | 9/1999 | Lawwill | |
| 6,164,676 A | 12/2000 | Wilcox | |
| 6,206,397 B1 | 3/2001 | Klassen et al. | |
| 6,270,104 B1 | 8/2001 | Nelson et al. | |
| 6,471,230 B2 | 10/2002 | Ellsworth et al. | |
| 6,663,076 B1 | 12/2003 | Tsai | |
| 6,845,998 B2 | 1/2005 | Probst | |
| 7,125,030 B2 | 10/2006 | D'Aluisio et al. | |
| 7,467,803 B2 | 12/2008 | Buckley | |
| 7,980,579 B2 | 7/2011 | Buckley | |
| 8,646,797 B2 | 2/2014 | Buckley | |
| 8,857,841 B2 | 10/2014 | Lund et al. | |
| 9,150,274 B1 * | 10/2015 | Musto | B62K 11/04 |
| 9,278,724 B2 | 3/2016 | Lund et al. | |
| 9,481,420 B2 | 11/2016 | McAndrews et al. | |
| 9,527,545 B2 * | 12/2016 | Juarez | F16F 9/3292 |
| 9,701,361 B2 | 7/2017 | Lumpkin | |
| 9,789,925 B2 | 10/2017 | Lund et al. | |
| 9,828,054 B2 | 11/2017 | D'Aluisio et al. | |
| 10,071,786 B2 | 9/2018 | Droux | |
| 10,086,899 B2 | 10/2018 | Hartung et al. | |
| 10,150,530 B2 | 12/2018 | Lund et al. | |
| 10,246,155 B2 | 4/2019 | McAndrews et al. | |
| 10,328,991 B2 | 6/2019 | Lund et al. | |
| 10,351,192 B2 | 7/2019 | Hartung et al. | |
| 10,363,988 B2 | 7/2019 | Buckley | |
| 10,710,662 B2 | 7/2020 | Bowers et al. | |
| 10,766,563 B2 * | 9/2020 | Hoogendoorn | B62K 25/286 |
| 10,919,592 B2 | 2/2021 | D'aluisio et al. | |
| 11,077,913 B2 | 8/2021 | Bergara Urcelai | |
| 11,242,110 B2 * | 2/2022 | Alsop | B62K 3/02 |
| 11,312,447 B2 | 4/2022 | Buckley | |
| 2004/0061305 A1 | 4/2004 | Christini | |
| 2006/0119069 A1 | 6/2006 | D'Aluisio et al. | |
| 2009/0065316 A1 | 3/2009 | Chen | |
| 2011/0248470 A1 | 10/2011 | Chubbuck | |
| 2012/0061941 A1 | 3/2012 | Choi et al. | |
| 2014/0110979 A1 | 4/2014 | Barkley et al. | |
| 2015/0321719 A1 | 11/2015 | Schmidt et al. | |
| 2016/0244114 A1 | 8/2016 | D'Aluisio et al. | |
| 2016/0332687 A1 | 11/2016 | Hartung et al. | |
| 2016/0339985 A1 | 11/2016 | Lund et al. | |
| 2019/0002050 A1 | 1/2019 | Shipman et al. | |
| 2019/0047649 A1 | 2/2019 | Chiesa | |
| 2019/0071146 A1 | 3/2019 | Shirai | |
| 2019/0077484 A1 | 3/2019 | Lund et al. | |
| 2019/0106171 A1 | 4/2019 | Eberlberger | |
| 2020/0070930 A1 | 3/2020 | Buckley | |

FOREIGN PATENT DOCUMENTS

| | | |
|---|---|---|
| EP | 0667281 A1 | 8/1995 |
| EP | 1312543 B1 | 1/2007 |
| EP | 2052957 A2 | 4/2009 |
| EP | 2698310 A1 | 2/2014 |
| EP | 2474465 B1 | 2/2015 |
| EP | 3246236 A1 | 11/2017 |
| EP | 3301004 B1 | 12/2018 |
| EP | 3265372 B1 | 8/2019 |
| EP | 3265373 B1 | 8/2019 |
| EP | 3708476 A1 | 9/2020 |
| FR | 2718703 A1 | 10/1995 |
| JP | H0710064 A | 1/1995 |

OTHER PUBLICATIONS

Firth, "Inside the New Intense VPP Prototypes", Mountain Bike Action, Jun. 19, 2002, Spyder VP 2002, (https://mbaction.com/inside-the-new-intense-vpp-prototypes-Jun. 19/), (4 pages).
Extended European Patent Office Search Report for Application No. 19165651.1-1013 dated Aug. 5, 2019 (8 Pages).

* cited by examiner

BICYCLE WITH COMPLIANT SEAT POST INTERFACE

CROSS-REFERENCE TO RELATED APPLICATIONS

This application is a continuation application of U.S. application Ser. No. 17/172,406, filed Feb. 10, 2021, which is a continuation application of U.S. application Ser. No. 15/947,584, filed Apr. 6, 2018, issued as U.S. Pat. No. 10,919,592 on Feb. 16, 2021, the entire contents of each of which are incorporated herein by reference.

BACKGROUND

The present invention relates generally to bicycles and specifically to bicycle frames having features for reducing the amount of road shock transmitted to the rider.

Bicycles designed for paved roads commonly have a rigidly mounted rear wheel, which is light weight and provides rear end stiffness that is desired by most serious road cyclists. In some riding conditions, such as when riding long distances or over rough roads, it would be desirable to reduce the amount of shock or vibration transmitted from the road to the rider. One way to accomplish this is to make the rear end of the bicycle compliant, which facilitates absorbing of the shock and vibration. However, such attempts to make the rear end of a road bike compliant have commonly resulted in an increase in weight or loss of rear end lateral stiffness, both of which are undesired.

SUMMARY

The present invention provides a bicycle comprising front and rear wheels, a frame supported on the front and rear wheels, a seat post supported by the frame, and a damping member. An upper portion of the seat post is movable relative to the frame between a static first position and a stressed second position. The damping member (e.g., a hydraulic damper) couples the seat post to the frame to dampen movement of the upper portion of the seat post between the first and second positions. A collar can be used to secure the damping member to the seat post. The damping member can be positioned at least partially in a tube of the frame, such as the top tube. Preferably, a lower portion of the seat post is substantially rigidly secured to the frame, and the seat post flexes when the upper portion of the seat post moves from the first position to the second position.

In one embodiment, the frame includes a seat tube having a length between a crank axis and an upper end of the seat tube, and the frame further includes a securing location for securing the seat post. In this embodiment, the securing location can be a distance from the upper end that is at least 30% (preferably at least 45% and more preferably at least 55%) of the length of the seat tube.

In another embodiment, the seat post has a front-to-rear width, and the frame includes a seat tube having a rear wall spaced from the seat post by a gap that is at least 25% (preferably at least 35% and more preferably at least 45%) of the front-to-rear width of the seat post.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
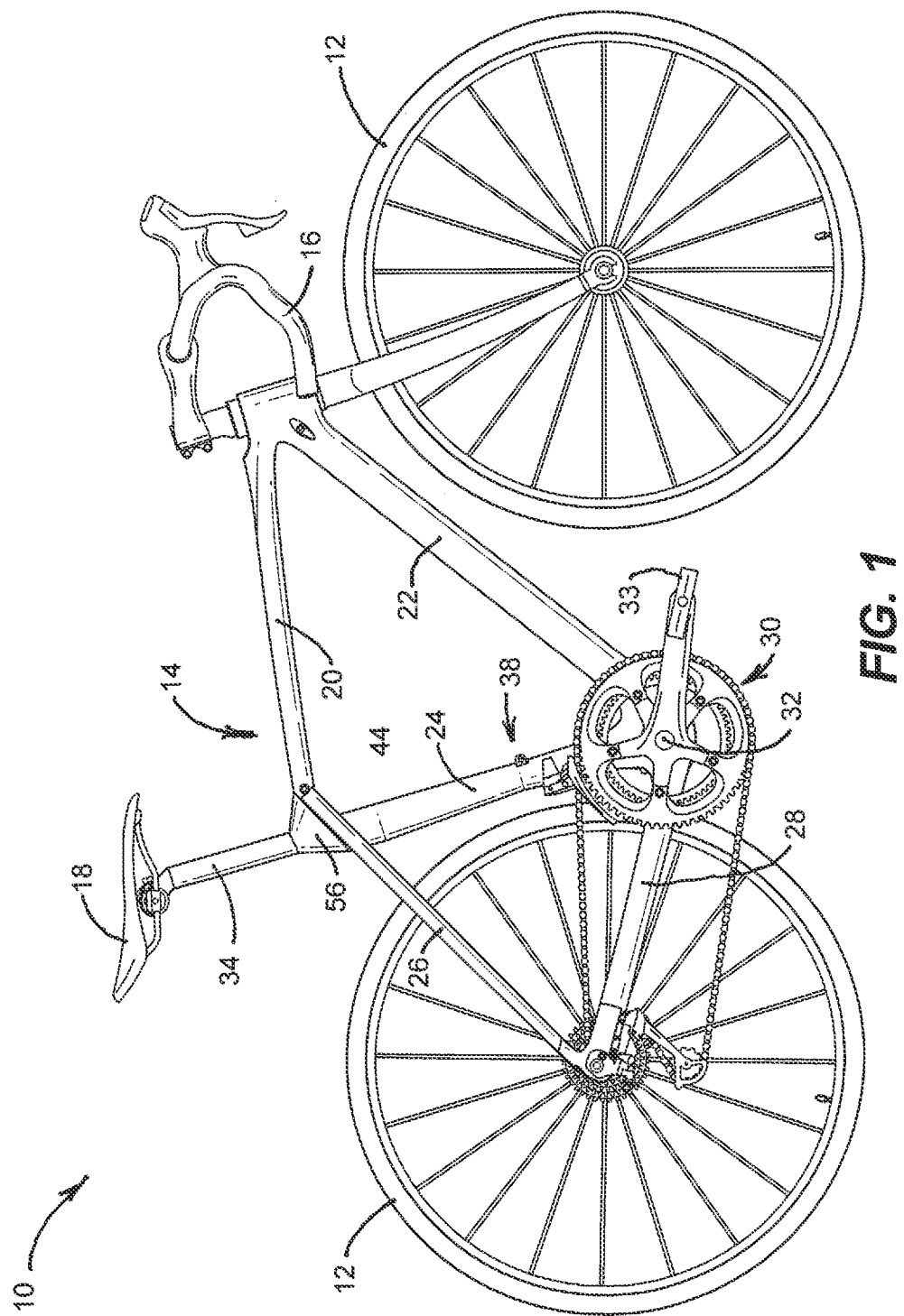
FIG. 1 is a side view of a bicycle embodying the present invention.
Figure 2:
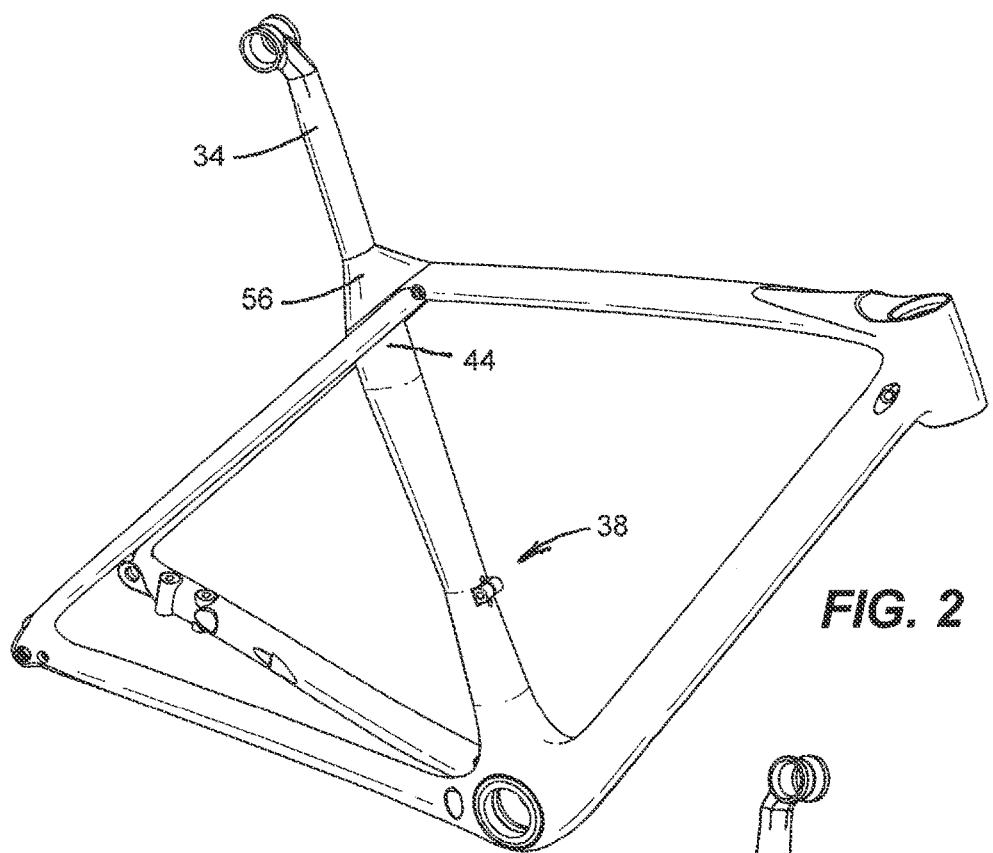
FIG. 2 is a front perspective view of a frame and seat post assembly from the bicycle of FIG. 1.
Figure 3:
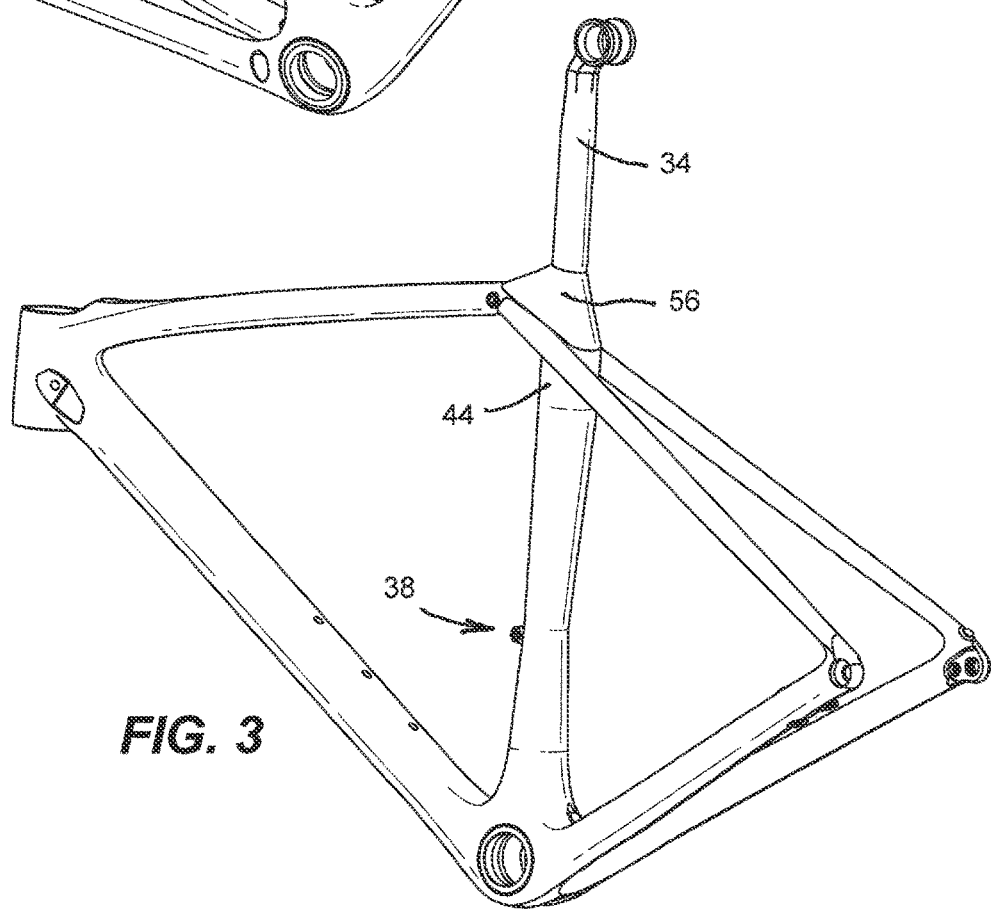
FIG. 3 is a rear perspective view of the frame and seat post assembly of FIG. 2.
Figure 4:
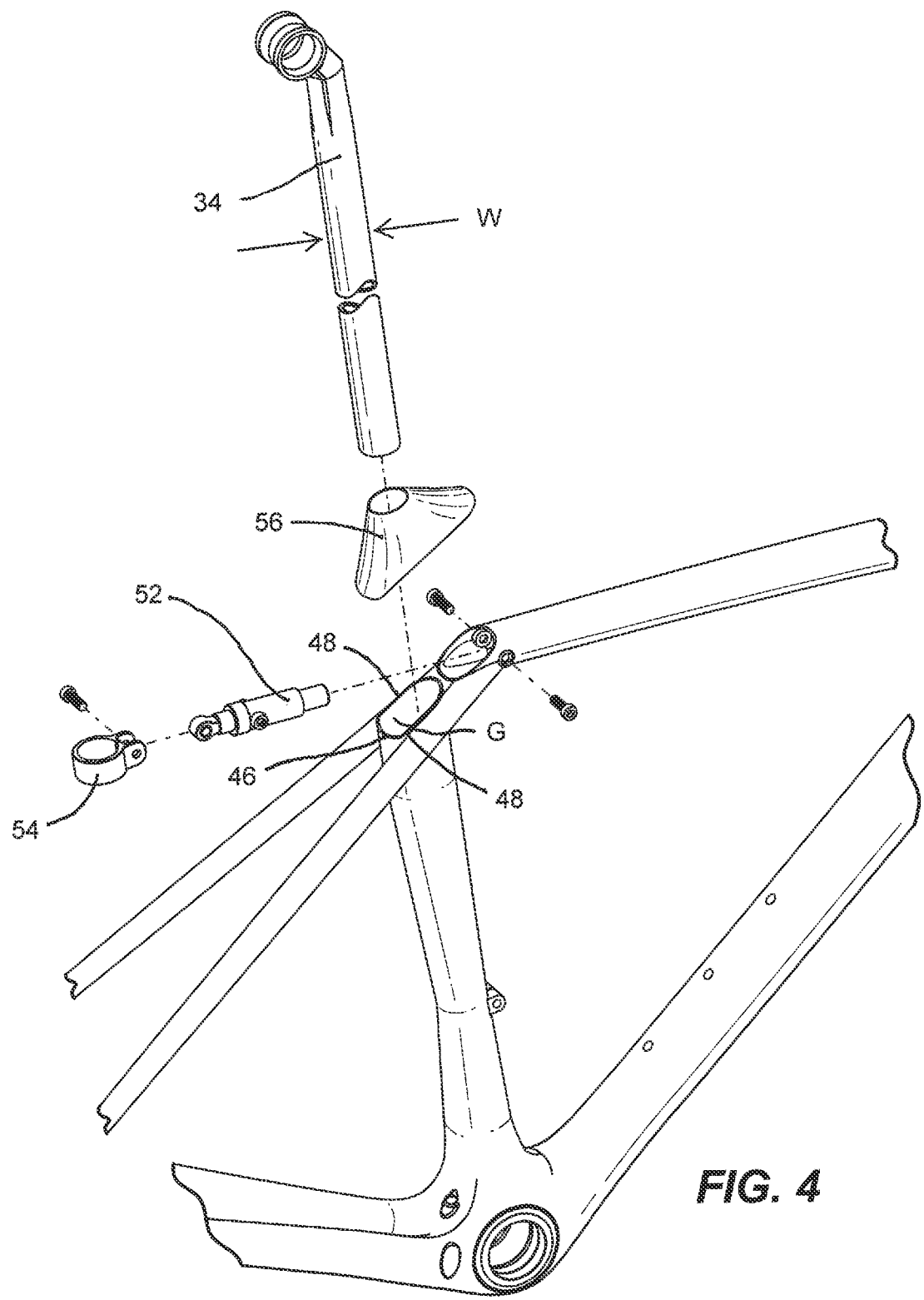
FIG. 4 is an enlarged exploded view of the frame and seat post assembly of FIG. 3.

FIG. 1 illustrates a bicycle 10 having two wheels 12, a frame 14 supported on the wheels 12, handlebars 16 for steering the bicycle 10, and a seat 18 for supporting the rider. The illustrated frame 14 includes a top tube 20, a down tube 22, a seat tube 24, two chainstays 26, and two seatstays 28, as is known in the art. A crankset 30 defines a crank axis 32 and supports two pedals 33. A seat post 34 is partially positioned inside the seat tube 24 and protrudes upwardly from the seat tube 24 to support the seat 18.

Referring to FIGS. 2-6, the seat post 34 is secured to the seat tube 24 by clamping at a clamping location 38 spaced from the upper end 36 of the seat tube 24 by a distance D that is about 60% of the length L of the seat tube (measured from the top of the seat tube to the crank axis 32). For example, for a frame having a seat tube length L of 560 mm, the distance D would be about 336 mm. The upper end 36 of the seat tube 24 includes a flared portion 44 that defines a gap G between a rear wall 46 of the flared portion 44 and the seat post 34. The illustrated gap is about 50% of the front/rear width W of the seat post 34. For example, for a seat post having a width of 27.2 mm, the gap would be about 13.6 mm. The opposing side walls 48 and front wall 50 of the flared portion 44 are substantially parallel to each other and define a much smaller gap between the walls 48,50 and the seat post 34.

Figure 5:
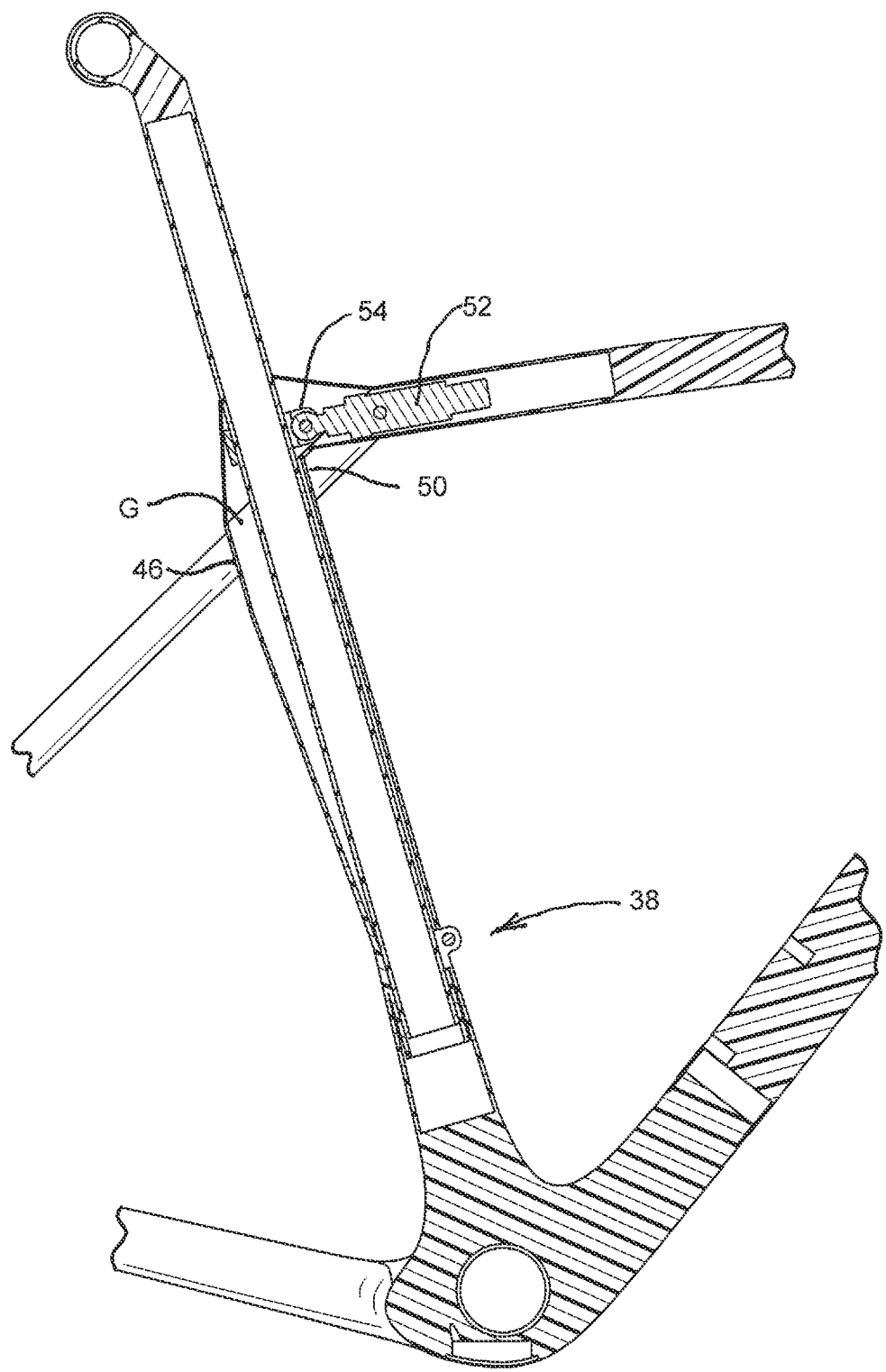
FIG. 5 is a section view of the frame and seat post assembly taken along line 5-5 in FIG. 2 with the seat post in an unflexed position.
Figure 6:
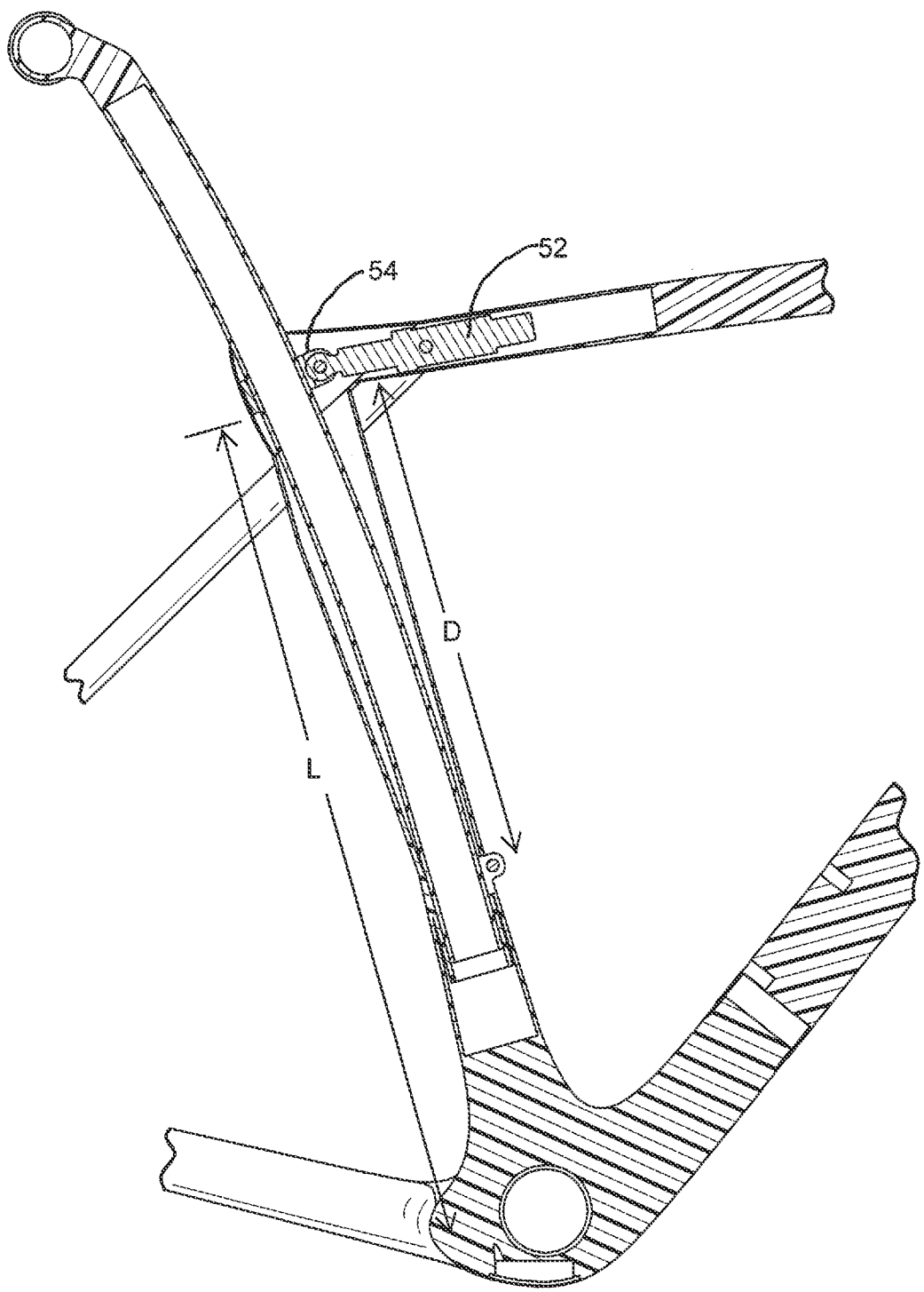
FIG. 6 is the section view of FIG. 5 with the seat post in a flexed position.

By virtue of the above-described flared portion 44 and gap G, the upper end of the seat post 34 can move (e.g., flex) rearwardly and downwardly to facilitate the absorption of shock and vibration travelling from the rear wheel 12 and through the seatstays 28. The rearward and downward flexing of the seat post is best shown in FIG. 5-6. It should be appreciated that instead of flexing the seat post could be designed to pivot or hinge relative to the frame. In such an embodiment, a biasing member would need to be used to bias the seat post toward the raised or unstressed position.

The illustrated arrangement further includes a damping member 52 operatively positioned between the seat post 34 and the frame 14. More specifically, the damping member 52 is secured between the top tube 20 and a collar 54 secured to the seat post 34, and is chosen to dampen movement of the seat post 34 between the unflexed and flexed positions. The illustrated damping member 52 is an oil-filled through shaft damper with a low speed rebound adjuster. It has bushings at each end of the outer tube so it can take side load from the seat post and it has a clevis mounting. Due to the close fit of the end bushings, the damper provides lateral stability to the seat post.

The illustrated arrangement further includes a resilient boot 56 positioned to cover the top opening of the seat tube 24, and particularly the gap G between the seat post 34 and the flared portion 44 of the seat tube 24. The boot 54 is made from a suitable elastomeric material, such as silicone. The boot 54 substantially fills the space between the seat post and the upper end of the seat tube 24, thereby prevent intrusion of unwanted substances, such as water or dirt.

It is envisioned that different riders might want different stiffnesses for the seat post (e.g., due to rider weight, riding style, or other preference). In this regard, the present invention allows the seat post to be customized to the rider's preference by changing the material, thickness, shape, or other relevant characteristic to achieve a seat post with the desired dynamic performance. In addition, in an alternative embodiment, the gap G between the seat post 34 and the flared portion 44 could be filled with a resilient bushing (not shown) to provide extra support to the seat post and resistance to flexing. In this embodiment, in the event that a rider perceives that the seat post 34 is flexing too little or too much, the bushing can be replaced with a softer or stiffer bushing to achieve the desired amount of flexing of the seat post 34.

Figure 7:
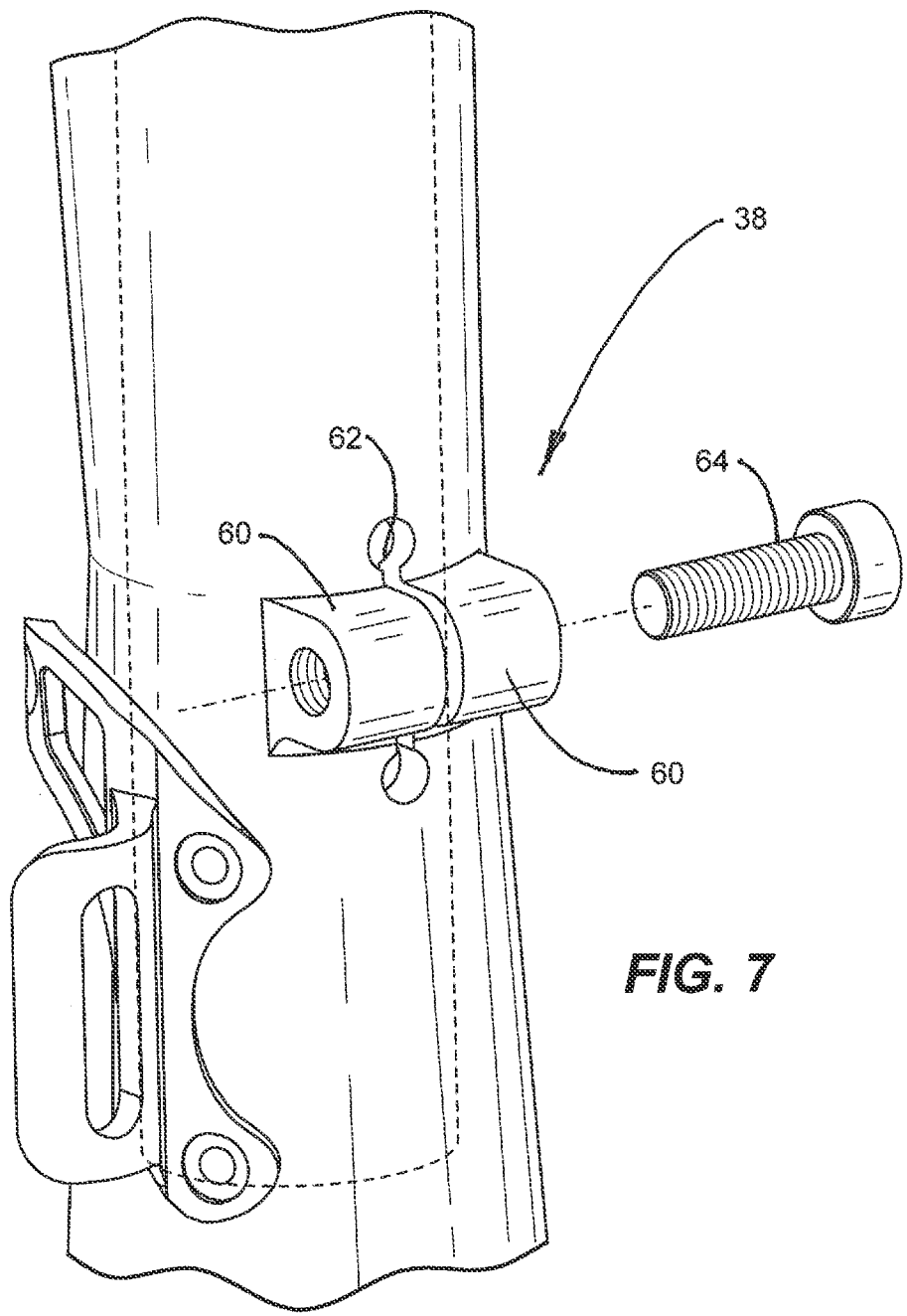
FIG. 7 is an enlarged view of a seat post binder clamp from the bicycle of FIG. 1.

Referring to FIG. 7, clamping the seat post 34 to the seat tube 24 is accomplished with a binder clamp including two ears 60 on opposing sides of a slot 62 in the seat tube 24. A fastener 64 can be inserted through one of the ears and threaded into the other to provide binding force to clamp the lower end of the seat post 34.

Various features and advantages of the invention are set forth in the following claims.

The invention claimed is:

1. A bicycle comprising:
a front wheel and a rear wheel;
a frame supported on the front wheel and the rear wheel, the frame comprising a seat tube having a top end;
a first, elongate structure supported by the seat tube, the first structure being at least partially hollow and having an upper portion that extends out of the top end of the seat tube and is movable relative to the seat tube between a first position and a second position rearward of the first position, wherein the first structure further includes a lower portion that is disposed within the seat tube, wherein a portion of the first structure is coupled to the seat tube at a securing location, wherein the first structure flexes relative to the securing location when the upper portion of the first structure moves from the first position to the second position; and
a translating member coupled to both the frame and the first structure and disposed at least partially within the frame, wherein the translating member is configured to change in length as the first structure flexes.

2. The bicycle of claim 1, wherein the translating member includes a housing and a rod configured to translate relative to the housing.

3. The bicycle of claim 2, wherein the housing is coupled to the frame with a clevis mounting.

4. The bicycle of claim 2, wherein the rod includes a first end and a second, opposite end, wherein the first end is coupled to the housing and the second end is coupled to the first structure.

5. The bicycle of claim 4, wherein the second end is coupled to a collar, and wherein the collar extends around a portion of the first structure.

6. The bicycle of claim 1, wherein the translating member is an oil-filled through shaft damper.

7. The bicycle of claim 1, wherein the translating member includes a low speed rebound adjuster.

8. The bicycle of claim 1, wherein the translating member includes a bushing to take side load from the first structure.

9. The bicycle of claim 1, wherein the seat tube has a length, wherein the securing location is at a distance from the top end that is at least 30% of the length of the seat tube.

10. The bicycle of claim 9, wherein the securing location is at a distance from the top end that is at least 55% of the length of the seat tube.

11. The bicycle of claim 1, wherein the seat tube has a slot, wherein the securing location includes a binder clamp having two ears on opposing sides of the slot.

12. The bicycle of claim 11, further comprising a fastener configured to be inserted through one of the two ears and threaded into the other of the two ears to provide binding force to clamp the first structure.

13. The bicycle of claim 1, wherein the frame includes a hollow tube, and wherein the translating member is disposed at least partially within the hollow tube.

14. The bicycle of claim 13, wherein the hollow tube is a top tube of the bicycle.

15. The bicycle of claim 1, wherein the frame includes a top tube coupled to the seat tube, and seat stays coupled to opposing sides of the top tube.

16. A frame for a bicycle, the frame comprising:
a first hollow tube;
a second hollow tube coupled to the first hollow tube;
a first, elongate structure disposed partially in the second hollow tube, the first structure being at least partially hollow and having an upper portion that is movable relative to the second hollow tube between a first position and a second position rearward of the first position, wherein a portion of the first structure is coupled to the second hollow tube at a securing location, wherein the first structure flexes relative to the securing location when the upper portion of the first structure moves from the first position to the second position; and
a telescoping member coupled to both the first hollow tube and the first structure and disposed at least partially within the first hollow tube, wherein the telescoping member is configured to change in length as the first structure flexes.

17. The frame of claim 16, wherein the first hollow tube is a top tube, and the second hollow tube is a seat tube.

18. The frame of claim 17, wherein the translating member includes a housing and a rod configured to slide within the housing, wherein the housing is coupled to the first hollow tube, and the rod is coupled to the first structure.

19. The frame of claim 16, wherein the second hollow tube includes a slot, wherein the securing location includes a binder clamp having two ears on opposing sides of the slot.

20. A bicycle comprising:
a front wheel and a rear wheel;
a frame supported on the front wheel and the rear wheel, the frame comprising a seat tube and a top tube;
a first, elongate structure supported by the seat tube, the first structure being at least partially hollow and having an upper portion that is movable relative to the seat tube between a first position and a second position, wherein a portion of the first structure is coupled to the seat tube at a securing location, wherein the first structure flexes relative to the securing location when the upper portion of the first structure moves from the first position to the second position;

a damping member positioned above the securing location and positioned between the top tube and the first structure, wherein the damping member is configured to dampen movement of the first structure between the first position and the second position; and a cover that extends over and at least partially encloses the damping member, wherein the cover is a separate element from the top tube.

* * * * *